(12) United States Patent
Roh et al.

(10) Patent No.: US 7,539,116 B2
(45) Date of Patent: May 26, 2009

(54) HOLOGRAPHIC DIGITAL DATA STORAGE SYSTEM COMPATIBLE WITH HOLOGRAPHIC AND REFLECTIVE MEDIUM

(75) Inventors: Jae-Woo Roh, Seoul (KR); Jang-Hyun Cho, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 620 days.

(21) Appl. No.: 11/251,828

(22) Filed: Oct. 18, 2005

(65) Prior Publication Data

US 2006/0067195 A1    Mar. 30, 2006

Related U.S. Application Data

(63) Continuation of application No. 09/815,046, filed on Mar. 23, 2001, now Pat. No. 6,999,397.

(51) Int. Cl.
*G11B 7/00* (2006.01)

(52) U.S. Cl. ...................................... 369/103

(58) Field of Classification Search ........................ None
See application file for complete search history.

(56) References Cited

U.S. PATENT DOCUMENTS

| | | | | | |
|---|---|---|---|---|---|
| 3,622,794 | A | * | 11/1971 | Pond et al. | 250/201.9 |
| 3,630,592 | A | * | 12/1971 | Cooper, Jr. | 359/1 |
| 3,635,545 | A | * | 1/1972 | VanKerkhove et al. | 359/569 |
| 3,858,239 | A | * | 12/1974 | Gorog | 348/41 |
| 4,213,193 | A | * | 7/1980 | Reid et al. | 365/125 |
| 4,408,277 | A | * | 10/1983 | Cortellini et al. | 345/419 |
| 4,655,539 | A | * | 4/1987 | Caulfield et al. | 359/9 |
| 4,707,135 | A | * | 11/1987 | Swain et al. | 356/457 |
| 4,929,823 | A | * | 5/1990 | Kato et al. | 250/201.5 |
| 5,289,407 | A | * | 2/1994 | Strickler et al. | 365/106 |
| 5,313,315 | A | * | 5/1994 | Feinberg et al. | 359/4 |
| 5,523,993 | A | * | 6/1996 | Freeman | 369/112.04 |
| 5,550,779 | A | * | 8/1996 | Burr et al. | 365/216 |
| 5,844,700 | A | * | 12/1998 | Jeganathan et al. | 359/7 |
| 5,917,798 | A | * | 6/1999 | Horimai et al. | 369/103 |
| 5,959,747 | A | * | 9/1999 | Psaltis et al. | 359/22 |
| 5,966,361 | A | * | 10/1999 | Stoll | 369/103 |
| 6,045,953 | A | * | 4/2000 | Ohe et al. | 430/1 |
| 6,097,513 | A | * | 8/2000 | Noh | 359/10 |
| 6,154,432 | A | * | 11/2000 | Faruqi et al. | 369/103 |
| 6,166,835 | A | * | 12/2000 | Yang | 359/22 |
| 6,239,877 | B1 | * | 5/2001 | Beauducel | 356/484 |
| 6,310,850 | B1 | * | 10/2001 | Sochava et al. | 369/103 |
| 6,330,088 | B1 | * | 12/2001 | Klug et al. | 359/23 |
| 6,504,810 | B2 | * | 1/2003 | Itoh et al. | 369/103 |
| 6,512,385 | B1 | * | 1/2003 | Pfaff et al. | 324/753 |

FOREIGN PATENT DOCUMENTS

JP            08273171 A    *  10/1996

* cited by examiner

*Primary Examiner*—Peter Vincent Agustin
(74) *Attorney, Agent, or Firm*—Bacon & Thomas, PLLC

(57) ABSTRACT

In a holographic digital data storage system, a light source generates a reference beam, a holographic optical element saves a plurality of interference patterns between the reference beam and a plurality of beams of specific sizes and a beam splitter splits each reproduced beam into a holographic signal beam and a holographic reference beam. A medium records an interference pattern between the holographic reference beam and the holographic signal beam and reflecting the holographic reference beam to generate a reflective information beam and, if only the holographic reference beam is illuminated, a displaying means displays a holographic reproduced beam for the holographic signal beam and detecting the reflective information beam.

10 Claims, 7 Drawing Sheets

HOLOGRAPHIC DIGITAL DATA STORAGE SYSTEM COMPATIBLE WITH HOLOGRAPHIC AND REFLECTIVE MEDIUM

CROSS REFERENCE TO RELATED APPLICATION

This application is a continuation application of U.S. Ser. No. 09/815,046 filed on Mar. 23, 2001, now U.S. Pat. No. 6,999,397, which claims priorities thereon pursuant to 35 USC 120.

FIELD OF THE INVENTION

The present invention relates to a holographic digital data storage system; and, more particularly, to a holographic digital data storage system compatible with a CD/DVD player.

BACKGROUND OF THE INVENTION

Recently, there have been reported increasing levels of active researches on holographic digital data storage systems triggered by the development of semiconductor lasers, charge coupled devices (CCDs), liquid crystal displays (LCDs) and the like. Since the holographic digital data storage system normally features a large storage capacity and high data transfer rate, it has already been applied to, e.g., fingerprint recognition systems for storing and reproducing fingerprints, and the scope of its applications keeps expanding.

The holographic digital data storage system allows a signal beam transmitted from an object to interfere with a reference beam, and writes interference patterns generated from such interference phenomena on a storage medium such as a crystal or a photopolymer which reacts differently depending on the amplitude and phase of an interference pattern. In the holographic digital data storage system, the phase of the signal beam as well as the amplitude thereof may be recorded by changing an incident angle of the reference beam, so that a three dimensional display of an object can be realized. Further, hundreds to thousands of holographic digital data comprised of binary data on a page-by-page basis can be stored in a single space of the storage medium.

FIG. 11 depicts an overall block diagram of a holographic digital data storage system, wherein the holographic digital data storage system comprises a light source 20, a beam expander 21, a beam splitter 22, two reflection mirrors 23 and 24, a spatial light modulator (SLM) 25, a medium 26 and a CCD 27.

The light source 20 generates an optical signal, e.g., a laser beam, whose wavelength falls within a specific wavelength band required for the holographic digital data. The beam expander 21 expands the size of the laser beam.

The beam splitter 22 separates the expanded laser beam into a reference beam and a signal beam and transfers the reference beam and the signal beam through two different transmission channels, wherein the reference beam and the signal beam correspond to a transmitted beam and a reflected beam, respectively.

The reference beam is reflected at the reflection mirror 24 so that the reflected reference beam is transferred to the medium 26. The signal beam, on the other hand, is reflected at the reflection mirror 23 so that the reflected signal beam is transferred to the SLM 25. The SLM 25 modulates the reflected signal beam into binary pixel data on a page basis. The modulated signal beam is transferred to the medium 26. In case the reflected signal beam is, for example, image data provided on a frame basis, the reflected signal beam is preferably modulated on a frame basis and the reflection mirror 24 functions to change the reflection angle of the reflected reference beam by a small amount.

The medium 26 stores the interference pattern acquired from an interference phenomenon between the reflected reference beam and the modulated signal beam, wherein the interference pattern depends on the reflected signal beam, i.e., the data inputted to the SLM 25. In other words, the modulated signal beam irradiated to the medium 26 is modulated on a page basis and the reflected reference beam is reflected in an angle corresponding to the modulated signal beam. The modulated signal beam interferes with the reflected reference beam within the medium 26. The amplitude and phase of the interference pattern results in a photo-induction within the medium 26 so that the interference pattern may be written on the medium 26.

When only the reference beam is irradiated onto the medium 26 in order to reconstruct the data written thereon, the reference beam is diffracted by the interference pattern within the medium 26 so that a check pattern with original brightness on a pixel basis may be restored. When the check pattern is irradiated on the CCD 27 in turn, the original data may be restored. The reference beam used for reproducing the data written on the medium 26 should be irradiated at the same incident angle as that of the reference beam when recording the data on the medium 26.

FIG. 12 presents a block diagram of a conventional CD or DVD player, wherein the CD/DVD player comprises a high frequency overlap module 10, two mirrors 11 and 18, a polarizing prism 12, a cylindrical lens 13, a photodiode (PD) 14, a $\lambda/4$ plate 15, a disc medium 16, an object lens 17 and a collimating lens 19. A detailed description for the structure and the operational principle of such CD/DVD player will be omitted here since it is well known to a person having ordinary skill in the relevant art.

As for the conventional CD/DVD player of FIG. 12 and the conventional holographic digital data storage system of FIG. 11, however, there has been found a drawback in that they cannot be compatible with each other since the positions of their detectors, e.g. optical diodes, are different from each other. To be specific, since the CD/DVD player has its detector along a direction of reflection while the holographic digital data storage system has its detector along a transmission direction, a single detector cannot be used for both systems. Further, the size difference of beams used in the two systems is so great that two different optical instruments are required.

SUMMARY OF THE INVENTION

It is, therefore, an object of the present invention to provide a holographic digital data storage system compatible with a CD/DVD player by using a holographic optical element with a plurality of beam sizes and numerical apertures produced by employing a spatial multiplexing technique or an angular multiplexing technique.

In accordance with a preferred embodiment of the present invention, there is provided a holographic digital data storage system comprising:

a light source for generating a reference beam;

means for saving a plurality of interference patterns between the reference beam and a plurality of beams of specific sizes and, if only the reference beam is illuminated, generating a plurality of reproduced beams corresponding to the plurality of beams of specific sizes;

means for splitting each reproduced beam into a reflected beam and a transmitted beam and assigning one of the reflected beam and the transmitted beam as a holographic reference beam;

means for modulating the other of the reflected beam and the transmitted beam into a holographic signal beam corresponding to a holographic input signal;

means for recording an interference pattern between the holographic reference beam and the holographic signal beam and reflecting the holographic reference beam to generate a reflective information beam, wherein the reflective information beam proceeds along an opposite direction to the holographic reference beam; and means for, if only the holographic reference beam is illuminated, displaying a holographic reproduced beam for the holographic signal beam and detecting the reflective information beam.

In accordance with another preferred embodiment of the present invention, there is provided a holographic digital data storage system comprising:

a light source for generating a reference beam;

means for adjusting a polarization of the reference beam to generate a multiplicity of polarized beams with a multiplicity of polarization components, respectively;

means for storing a number of interference patterns between the multiplicity of polarized beams and a number of reflective beams of specific sizes and between the multiplicity of polarized beams and holographic beams of specific sizes, wherein the holographic beams of specific sizes have the multiplicity of polarization components, and, if the multiplicity of polarized beams are illuminated, generating reflective reproduced beams corresponding to the reflective beams of specific sizes and holographic reproduced beams corresponding to the holographic beams of specific sizes, wherein the holographic reproduced beams have a multiplicity of holographic polarization components transferred through separate paths;

means for collimating the polarization directions of the holographic reproduced beams to generate a first and a second holographic beam, wherein one of the first and the second beam is used as a holographic reference beam;

means for modulating the other of the first and the second beam into a holographic signal beam corresponding to holographic input signals;

means for recording an interference pattern between the holographic reference beam and the holographic signal beam and reflecting the reflective reproduced beams to generate reflective information beams, wherein the reflective information beams proceed along an opposite direction of the reflective reproduced beams;

means for, if only the holographic reference beam is illuminated, displaying a holographic reproduced beam for the holographic signal beam and detecting the reflective information beams; and means for introducing the reflective reproduced beam into said recording means and transferring the reflective information beams into said displaying.

In accordance with still another preferred embodiment of the present invention, there is provided a holographic digital data storage system comprising:

a light source for generating a reference beam;

means for splitting the reference beam into a first and a second beam to proceed through separate paths;

means for modulating the first beam into a holographic signal beam corresponding to holographic input signals;

means for storing a number of interference patterns between the second beam and reflective beams of specific sizes and between the second beam and a holographic beam of specific size and, if the second beam is illuminated, generating reflective reproduced beams corresponding to the reflective beams of specific sizes and a holographic reproduced beam corresponding to the holographic beam of specific size, wherein the holographic reproduced beam functions as a holographic reference beam;

means for recording an interference pattern between the holographic reference beam and the holographic signal beam and reflecting the reflective reproduced beams to generate reflective information beams, wherein the reflective information beams proceed along an opposite direction of the reflective reproduced beams;

means for, if only the holographic reference beam is illuminated, displaying a holographic reproduced beam for the holographic signal beam and detecting the reflective information beam; and means for introducing the reflective reproduced beams into said recording means and turning the reflective information beams into said displaying means.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Figure 1:
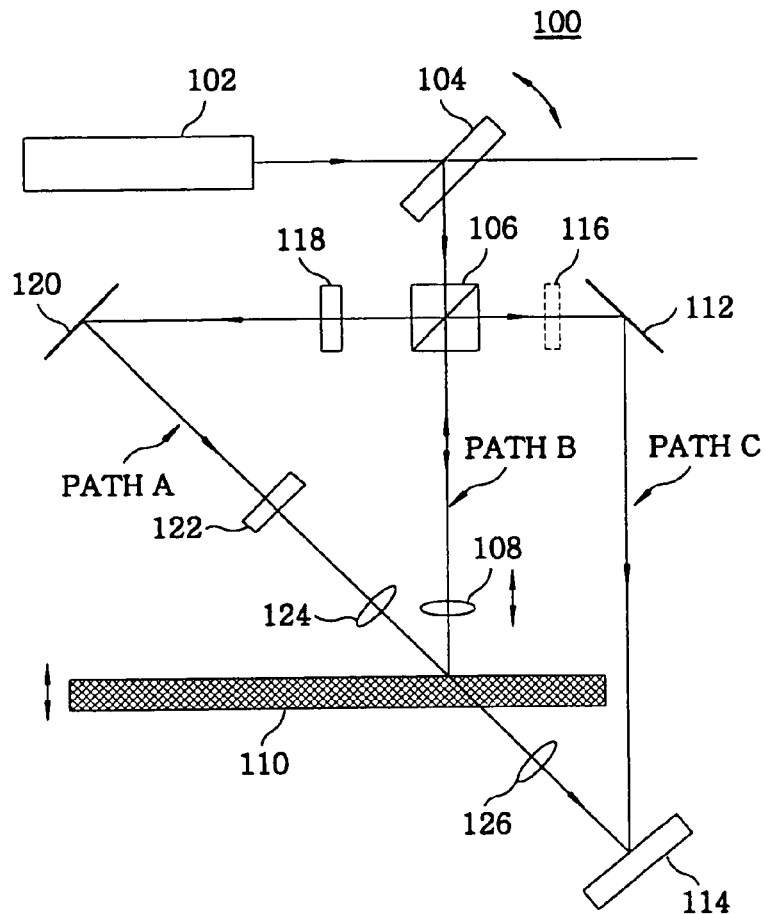
FIG. 1 presents a block diagram of a holographic digital data storage system compatible with a CD/DVD player in accordance with a first embodiment of the present invention.

FIG. 1 is a block diagram of a holographic digital data storage system 100 in accordance with a first embodiment of the present invention which is compatible with a CD/DVD player, wherein the holographic storage system 100 comprises a light source 102, a holographic beam splitter 104, a beam splitter 106, three lenses 108, 124, 126, a medium 110, two mirrors 112, 120, a charge coupled device (CCD) 114, a photodiode (PD) 116, a shutter 118 and a spatial light modulator (SLM) 122.

The light source 102 is an essential element for the writing and reconstruction process of the holographic digital data storage system. A laser, for example, can be used as the light source. The light source 102 provides an optimum wavelength band for the medium 110 of the holographic digital data storage system. An available wavelength band depends on a photo-sensitizer and an initiator added to the medium 110.

The holographic beam splitter 104 is made of a same material as used in a holographic memory. The beam from the light source 102 is used as a reference beam. If a beam of a specific size is introduced to the holographic beam splitter 104 with a predetermined angle with respect to the reference beam, an interference pattern between the reference beam and the beam of the specific size is recorded within the holographic beam splitter 104.

Figure 2:
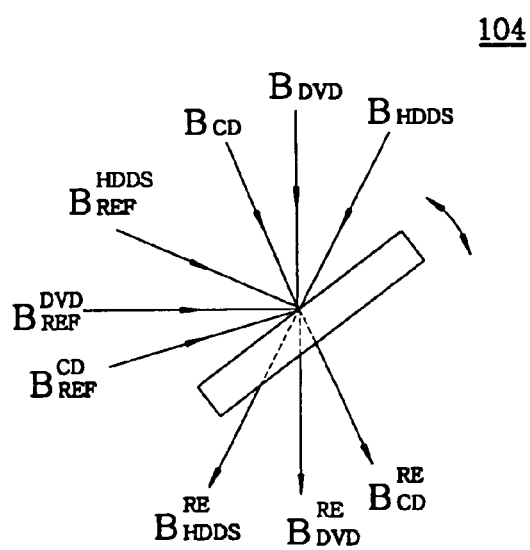
FIG. 2 describes an embodiment of the holographic beam splitter shown in FIG. 1.

Referring to FIG. 2, there is illustrated an embodiment of the holographic beam splitter 104 which may be made by employing an angular multiplexing technique. It is assumed that three reference beams $B_{REF}^{CD}, B_{REF}^{DVD}, B_{REF}^{HDDS}$ are introduced, wherein the three reference beams $B_{REF}^{CD}, B_{REF}^{DVD}, B_{REF}^{HDDS}$ have different incident angles but have a same wavelength. If the three reference beams $B_{REF}^{CD}, B_{REF}^{DVD}, B_{REF}^{HDDS}$ and their corresponding beams of specific sizes $B_{CD}, B_{DVD}, B_{HDDS}$ are introduced with predetermined relative angles, respectively, the interference patterns between three reference beams $B_{REF}^{CD}, B_{REF}^{DVD}, B_{REF}^{HDDS}$ and their corresponding beams of specific sizes $B_{CD}, B_{DVD}, B_{HDDS}$ are recorded within the holographic memory by using the angular multiplexing method. The beam sizes and shapes of beams of specific sizes $B_{CD}, B_{DVD}, B_{HDDS}$ depend on the medium on which they are recorded. If only the three reference beams $B_{REF}^{CD}, B_{REF}^{DVD}, B_{REF}^{HDDS}$ are introduced at corresponding predetermined respective angles to the holographic memory in which the interference patterns have been recorded, three reproduced beams $B_{CD}^{RE}, B_{DVD}^{RE}, B_{HDDS}^{RE}$ for three beams of specific sizes $B_{CD}, B_{DVD}, B_{HDDS}$ are generated. The intensities of the three reproduced beams $B_{CD}^{RE}, B_{DVD}^{RE}, B_{HDDS}^{RE}$ may be represented as diffraction efficiencies of the interference patterns. The diffraction efficiency in photopolymer may be substantially 100%.

A beam factor BF of the CD/DVD player should be constant for the holographic digital data storage system and the CD/DVD player to be compatible. In general, the beam factor $B_F$ of the CD player is 0.57690 $\square m^{-1}$ and the beam factor $B_F$ of the DVD player is 0.9230 $\square m^{-1}$. The beam factor $B_F$ can be calculated as follows:

$$B_F = \frac{N.A.}{\lambda} \qquad \text{Eq. 1}$$

wherein $\lambda$ and N.A. represent a wavelength of the beam and a numerical aperture, respectively. When a different wavelength is used, the N.A. can be adjusted in such a way that the $B_F$ remains constant and thus the CD/DVD player can be played. The N.A. is calculated as follows:

$$N.A. = n \cdot \sin\alpha \qquad \text{Eq. 2}$$

wherein n represents a refractive index of a material filled behind the lens through which the beam passes and α represents a concentration angle with respect to an optical axis, i.e., a central axis, of the lens in case an incident beam vertical to the lens is concentrated on a focus. In other words, $\sin\alpha$ is a function of the focal length F of the lens and a beam width W of the beam incident into the lens and is given as follows:

$$\sin\alpha = \frac{W}{2\sqrt{\left(\frac{W}{2}\right)^2 + F^2}} \qquad \text{Eq. 3}$$

Accordingly, the beam width W can be derived from the following equation:

$$W = \frac{2FB_F\lambda}{n} \cdot \frac{1}{\sqrt{1 - \left(\frac{B_F\lambda}{n}\right)^2}} \qquad \text{Eq. 4}$$

Consequently, the $B_1$, can be sustained at a constant value by controlling the beam width W and thereby adjusting the N.A., so that the CD/DVD player can be played.

When a laser beam having a wavelength $\lambda$ of 532 nm is transmitted through the air whose refractive index is 1 and a lens with a focal length F of 1 cm is employed, a beam factor $B_{FCD}$ for the CD player and a beam factor $B_{FDFD}$ for the DVD player are 0.5769 $\mu m^{-1}$ and 0.9230 $\mu m^{-1}$, respectively. Accordingly, the beam widths $W_{CD}$ and $W_{DVD}$ required in the CD/DVD player are calculated as follows, respectively:

$$W_{CD} = \frac{2(1 \text{ cm})(0.5769\ \mu m^{-1})(0.532\ \mu m)}{\sqrt{1 - (0.5769\ \mu m^{-1})^2(0.532\ \mu m)^2}} = 0.64495 \text{ cm} \qquad \text{Eq. 5}$$

$$W_{DVD} = \frac{2(1 \text{ cm})(0.9230\ \mu m^{-1})(0.532\ \mu m)}{\sqrt{1 - (0.9230\ \mu m^{-1})^2(0.532\ \mu m)^2}} = 1.12734 \text{ cm} \qquad \text{Eq. 6}$$

The beam widths $W_{CD}/W_{DVD}$ for the beams of specific sizes $B_{CD}, B_{DVD}$ are 0.64495 cm and 1.12734 cm, respectively.

When an Nd-YAG laser beam having a wavelength $\lambda$ of 650 nm is transmitted through the air whose refractive index is 1 and a lens with a focal length F of 1 cm is employed, the beam widths $W_{CD}$ and $W_{DVD}$ required in the CD/DVD player are calculated as follows, respectively:

$$W_{CD} = \frac{2(1 \text{ cm})(0.5769\ \mu m^{-1})(0.650\ \mu m)}{\sqrt{1 - (0.5769\ \mu m^{-1})^2(0.650\ \mu m)^2}} = 0.80900 \text{ cm} \qquad \text{Eq. 5}$$

$$W_{DVD} = \frac{2(1 \text{ cm})(0.9230\ \mu m^{-1})(0.650\ \mu m)}{\sqrt{1 - (0.9230\ \mu m^{-1})^2(0.650\mu m)^2}} = 1.49980 \text{ cm} \qquad \text{Eq. 6}$$

The beam widths $W_{CD}/W_{DVD}$ for the beams of specific sizes $B_{CD}, B_{DVD}$ are 0.80900 cm and 1.49980 cm, respectively.

The beam size can be adjusted for both a holographic mode and a CD/DVD mode with a same wavelength by using the holographic beam splitter 104.

In the holographic mode, the reference beam $B_{REF}^{HDDS}$ is introduced to the holographic beam splitter 104 with a predetermined incident angle. The holographic beam splitter 104 generates a reproduced beam $B_{HDDS}^{RE}$ corresponding to the reference beam $B_{REF}^{HDDS}$ and the beam of specific size $B_{HDDS}$; and the beam splitter 106 splits the reproduced beam $B_{HDDS}^{RE}$ into a reflected beam and a transmitted beam. The reflected beam is illuminated into the medium 110 through a path A. The shutter 118 on the path A may operate to transmit the reflected beam only in the recording state of the holographic mode and not in the reproduction state of the holographic mode. After being transmitted through the shutter 118, the reflected beam is reflected again by the mirror 120 and modulated by the SLM 122 in order to correspond to input signals so that a holographic signal beam is generated. The holographic signal beam is focused to the medium 110 by the lens 124. In the meantime, the transmitted beam is illuminated through the path B to the medium 110 as a holographic reference beam, wherein the lens 108 functions to concentrate the holographic reference beam. The interference pattern between the holographic reference beam and the holographic signal beam is recorded on the medium 110.

The medium 110 may be movable upwards or downwards so that the beam may be focused in front of or in the rear of the medium 110 by the lenses 124 and 108. For example, in case a shift multiplexing principle is used, the beam is preferably focused in front of the medium 110 by the lenses 124 and 108 in the holographic mode while the beam may be preferably focused in the rear of the medium 110 in the CD/DVD mode. In case two lenses with two different focal distances are used, a lens with a shorter focal distance may be preferably used for the holographic mode, if necessary, while the other lens with the longer focal distance may be used for the CD/DVD mode.

In the reproduction state of the holographic mode, the shutter 118 is shut off so that only the transmitted beam is introduced to the medium through the path B. Since the transmitted beam functions as the holographic reference beam, a holographic reproduced beam is produced in an original direction of the holographic signal beam introduced into the medium 110 in the recording state. The holographic reproduced beam is focused by the lens 126 and displayed on the charge coupled device (CCD) 114.

In the CD/DVD mode, the holographic beam splitter 104 is rotated by a predetermined angle so that the reference beam $B_{REF}^{CD}/B_{REF}^{DVD}$ may be introduced and, therefore, the reproduced beam $B_{CD}^{RE}/B_{DVD}^{RE}$ corresponding to the reference beam $B_{REF}^{CD}/B_{REF}^{DVD}$ is generated by the holographic beam splitter 104. The beam splitter 106 divides the reproduced beam $B_{CD}^{RE}/B_{DVD}^{RE}$ into a reflected beam and a transmitted beam and the shutter 118 makes the reflected beam shut off. The transmitted beam is introduced into the CD/DVD medium 110 through the lens 108 after passing through the path B. The beam factor $B_F$ of the beam has previously been controlled before the beam is introduced to the medium 110. The beam is reflected by the medium 110 to generate a CD/DVD reproduced beam and the CD/DVD reproduced beam is transferred through the path B. The CD/DVD reproduced beam is reflected and transmitted again by the beam splitter 106 to generate a reflected reproduced beam and a transmitted reproduced beam. The transmitted reproduced beam is transferred to the holographic beam splitter 104 so that it does not affect the reproduction signal. Accordingly, the reflected reproduced beam proceeds along the path C to be detected by the photodiode 116 or the CCD 114.

Figure 3:
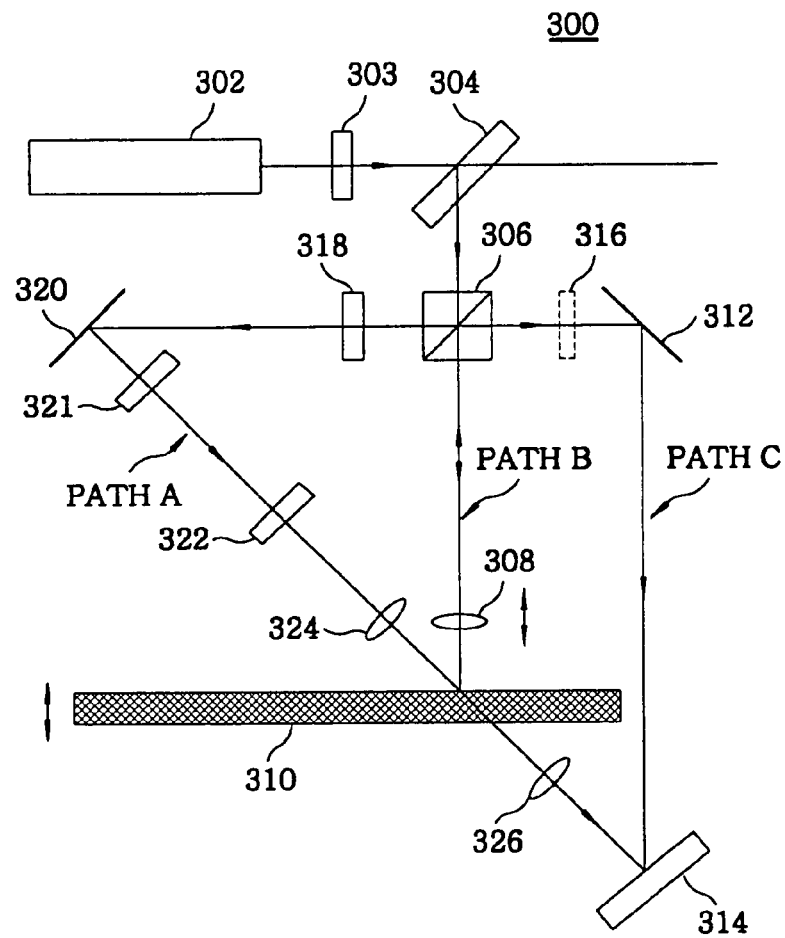
FIG. 3 illustrates a block diagram of a holographic digital data storage system compatible with a CD/DVD player in accordance with a second embodiment of the present invention.

Referring to FIG. 3, there is illustrated a block diagram of a holographic digital data storage system 300 in accordance with a second embodiment of the present invention which is compatible with a CD/DVD player, wherein the holographic storage system 300 comprises a light source 302, a λ/2 plate 303, a holographic polarized beam splitter 304, a beam splitter 306, three lenses 308, 324, 326, a medium 310, two mirrors 312, 320, a charge coupled device (CCD) 314, a photodiode (PD) 316, a shutter 318, a beam expander 321 and a spatial light modulator (SLM) 322. In comparison with the first embodiment illustrated in FIG. 1, the λ/2 plate 303, the holographic polarized beam splitter 304 and the beam expander 321 are added.

The λ/2 plate 303 allows the polarization direction of the linearly polarized beam introduced from the light source 302 to be rotated by a predetermined angle. The beam with the rotated polarization direction is introduced to the holographic polarized beam splitter 304.

The holographic polarized beam splitter 304 is made of a higher birefringence material such as $LiNbO_3$ or $BaTiO_3$. Since the refractive index difference between the ordinary beam and the extraordinary beam may be used, the reproduced beams may be selectively generated in accordance with the reference beams with different polarization directions.

Figure 4:
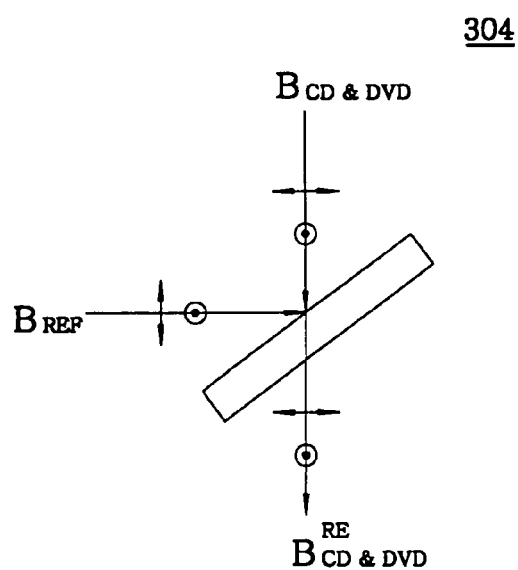
FIG. 4 demonstrates an embodiment of the holographic polarized beam splitter shown in FIG. 3.

Referring to FIG. 4, there is illustrated an embodiment of the holographic beam splitter 304 made by using the birefringence characteristics. It is assumed that CD/DVD horizontal/vertical polarized beams of specific sizes $B_{CD\&DVD}$ are used to reproduce the CD player and the DVD player. The CD/DVD horizontal/vertical polarized beams of specific sizes $B_{CD\&DVD}$ have the beam sizes and the beam shapes required in the CD player and the DVD player, respectively. The horizontal/vertical polarized reference beams $B_{REF}$ are introduced from the λ/2 plate 303 and the CD/DVD horizontal/vertical polarized beams of specific sizes $B_{CD\&DVD}$ are also introduced with a predetermined angle with respect to the horizontal/vertical polarized reference beams $B_{REF}$. The interference pattern between the reference beams $B_{REF}$ and the CD/DVD horizontal/vertical polarized beams of specific sizes $B_{CD\&DVD}$ is recorded on the holographic polarized beam splitter 304. In the reproduction mode, only the horizontal/vertical polarized beams $B_{REF}$ are introduced so that the reproduced beams $B_{CD\&DVD}^{RE}$ corresponding to the CD/DVD horizontal/vertical polarized beams of specific sizes $B_{CD\&DVD}$ are produced along the incident direction of the CD/DVD horizontal/vertical polarized beams of specific sizes $B_{CD\&DVD}$.

Since the polarization direction is changed by the λ/2 plate 303, no additional device is required to move or rotate the holographic polarized beam splitter 304. The beam expander 321 must be added in order that only two horizontal/vertical polarizations are used for changing the beam factor of the CD/DVD beams into that of the holographic beam.

In the CD/DVD mode, the λ/2 plate 303 is controlled to make the direction of the beam be oriented to be horizontal or vertical. The horizontal/vertical polarizations correspond to the CD and the DVD mode, respectively, and the reproduced beams $B_{CD\&DVD}^{RE}$ with the corresponding beam sizes are generated to be illuminated to the beam splitter 306. The beam splitter 306 divides the reproduced beam $B_{CD\&DVD}^{RE}$ into a reflected beam and a transmitted beam and the shutter 318 makes the reflected beam shut off. The remaining process is the same as that of the CD/DVD mode of the holographic digital data storage system shown in FIG. 1.

In the holographic mode, the λ/2 plate 303 is rotated by a predetermined polarization angle so that the polarization of the beam may be changed. The polarization angle is not limited and the beam with a predetermined polarization angle is introduced into the holographic polarized beam splitter 304 as a reference beam. The holographic polarized beam splitter 304 generates the reproduced beam $B_{CD\&DVD}^{RE}$ corresponding to the horizontal and the vertical components of the reference beam $B_{RED}$ and the beam splitter 306 divides the reproduced beam $B_{CD\&DVD}^{RE}$ into a holographic reference beam and a holographic signal beam. The holographic reference beam proceeds through the path B and the holographic signal beam proceeds through the path A so that an interference pattern is recorded on the medium 310. The beam expander 321 is added on the path A in order to control the beam size of the holographic signal beam. In the reproduction mode, the shutter 318 is controlled in order that only the holographic reference beam is introduced to the medium 310 and a holographic reproduced beam corresponding to the holographic signal beam is generated. The holographic reproduced beam is displayed on the CCD 314.

Figure 5:
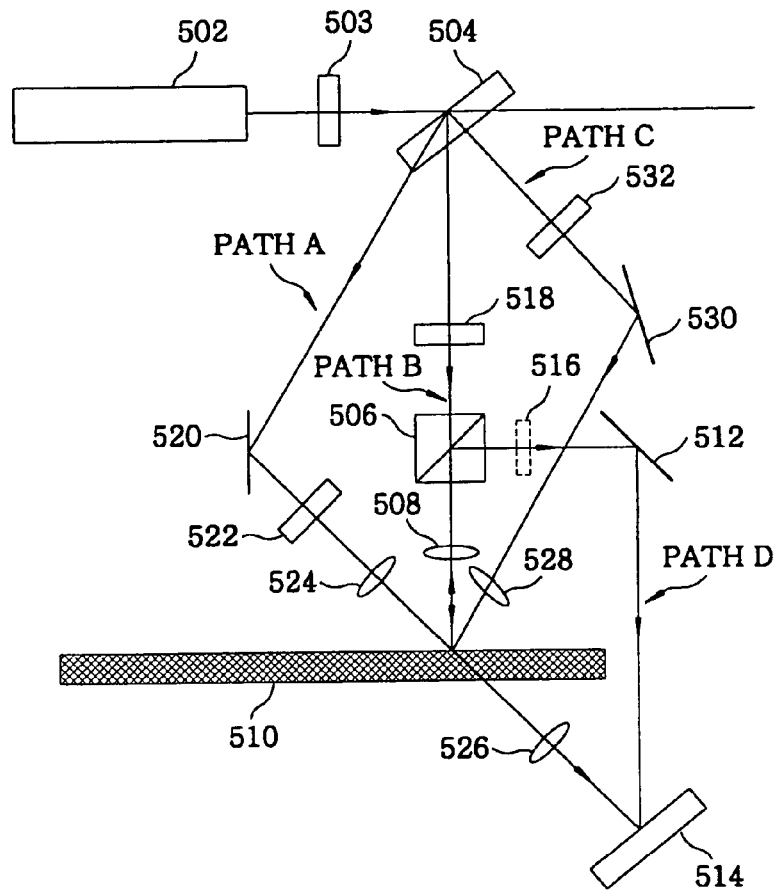
FIG. 5 represents a block diagram of a holographic digital data storage system compatible with a CD/DVD player in accordance with a third embodiment of the present invention.

Referring to FIG. 5, there is illustrated a block diagram of a holographic digital data storage system 500 compatible with a CD/DVD player in accordance with a third embodiment of the present invention, wherein the holographic storage system 500 comprises a light source 502, two λ/2 plates 503 and 532, a holographic polarized beam splitter 504, a beam splitter 506, four lenses 508, 524, 526 and 528, a medium 510, three mirrors 512, 520 and 530, a charge coupled device (CCD) 514, a photodiode (PD) 516, a shutter 518 and a spatial light modulator (SLM) 522. In the holographic digital data storage system 500 shown in FIG. 5, the optical path of the CD/DVD mode is different from that of the holographic mode. In comparison with the fist embodiment shown in FIG. 1, two λ/2 plate 503 and 532, the holographic polarized beam splitter 504, the lens 528 and the mirror 530 are added and the shutter 518 is moved.

The λ/2 plate 503 allows the polarization direction of the linearly polarized beam introduced from the light source 502 to be rotated by a predetermined angle. The beam with the rotated polarization direction is introduced to the holographic polarized beam splitter 504.

The holographic polarized beam splitter 504 is made of a higher birefringence material such as $LiNbO_3$ or $BaTiO_3$. Since the refractive index difference between the ordinary beam and the extraordinary beam may be used, the reproduced beams may be selectively generated in accordance with the reference beams with different polarization directions.

Figure 6:
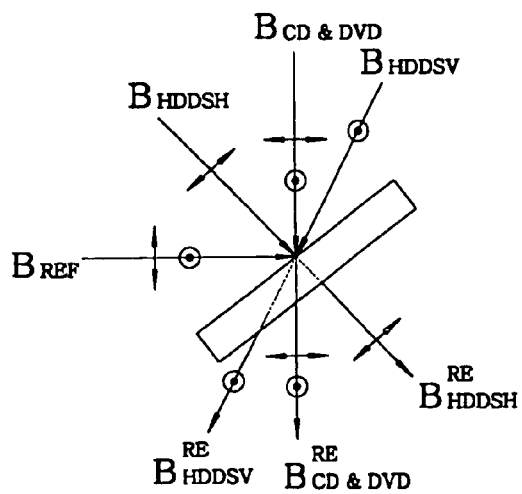
FIG. 6 explains an embodiment of the holographic polarized beam splitter shown in FIG. 5.

Referring to FIG. 6, there is illustrated an embodiment of the holographic polarized beam splitter 504 made by using the birefringence characteristics. It is assumed that CD/DVD horizontal/vertical polarized beams of specific sizes $B_{CD\&DVD}$ are used to reproduce the CD player and the DVD player, respectively and holographic horizontal/vertical polarized beams of specific sizes $B_{HDDSH}$ and $B_{HDDSV}$ are used to reproduce the holographic signals. The CD/DVD horizontal/vertical polarized beams of specific sizes $B_{CD\&DVD}$ have the beam sizes and the beam shapes required in the CD player and the DVD player, respectively. The horizontal/vertical polarized reference beams $B_{REF}$ are introduced from the λ/2 plate 503 and the CD/DVD horizontal/vertical polarized beams of specific sizes $B_{CD\&DVD}$ are also introduced with a predetermined angle with respect to the horizontal/vertical polarized reference beams $B_{REF}$. The holographic horizontal/vertical polarized beams of specific sizes $B_{HDDSH}$ and $B_{HDDSV}$ are also introduced with a predetermined angle from each other. In other words, if the horizontal polarized reference beam $B_{REF}$ with a horizontal polarized component is introduced, two horizontal polarized beams of specific sizes $B_{CD\&DVD}$ and $B_{HDDSH}$ are recorded on the holographic polarized beam splitter 504 with two different incident angles and, if the vertical polarized reference beam $B_{REF}$ with a vertical polarized component is introduced, two vertical polarized beams of specific sizes $B_{CD\&DVD}$ and $B_{HDDSV}$ are recorded with two different incident angles. In the reproduction mode, if only the horizontal polarized reference beam $B_{REF}$ is illuminated, two reproduced beams $B_{CD\&DVD}^{RE}$ and $B_{HDDSH}^{RE}$ are generated along the incident direction of two horizontal polarized beams of specific sizes $B_{CD\&DVD}$ and $B_{HDDSH}$, respectively. For illustration, it is supposed that the CD/DVD horizontal/vertical polarized beams of specific sizes $B_{CD\&DVD}$ are used to the CD/DVD player, respectively, and the holographic horizontal/vertical polarized beams of specific sizes $B_{HDDSH}$ and $B_{HDDSV}$ are used as a holographic reference beam and a holographic signal beam.

In the CD mode, the λ/2 plate 503 is controlled to make the direction of the beam be horizontally oriented. If only the horizontal polarized beam is introduced into the holographic polarized beam splitter 504, the horizontally polarized CD reproduced beam $B_{CD}^{RE}$ and the horizontally polarized holographic reproduced beam $B_{HDDSH}^{RE}$ are provided along the path B and the path C, respectively. The CD reproduced beam $B_{CD}^{RE}$ is transferred into the shutter 518, the beam splitter 506 and the lens 508 along the path B and introduced to the medium 510. The reflected beam of the CD reproduced beam $B_{CD}^{RE}$ reflected by the medium 510 functions as a CD signal beam. The CD signal beam is further reflected by the beam splitter 506, and proceeds along the path D to be detected by the PD 516 or the CCD 514. The holographic reproduced beam $B_{HDDSH}^{RE}$ is transferred into the λ/2 plate 532, the mirror 530 and the lens 528 and introduced into the medium 510. Since, however, the medium 510 is of a reflection type in the CD mode, the holographic reproduced beam $B_{HDDSH}^{RE}$ is reflected with the same angle as the incident angle so that the CD player may be reproduced with no error. If necessary, a shutter may be added on the path C.

In the DVD mode, the λ/2 plate 503 is controlled to make the direction of the beam be vertically oriented. If only the vertical polarized beam is introduced into the holographic polarized beam splitter 504, the vertically polarized DVD reproduced beam $B_{DVD}^{RE}$ and the vertically polarized holographic reproduced beam $B_{HDDSV}^{RE}$ are provided along the path B and the path A, respectively. The DVD reproduced beam $BDVD^{RE}$ is transferred through the path B to be used to reproduce the DVD player while the holographic reproduced beam $B_{HDDSV}^{RE}$ is reflected by the medium 510 so that it does not influence the production of the DVD signal.

In the holographic mode, the λ/2 plate 503 is rotated by a predetermined polarization angle so that the reference beam has a horizontal and a vertical components. The holographic polarized beam splitter 504 is used to generate three reproduced beams with three different directions. Since, however, the shutter 518 turns to be shut off, there is no beam proceeding on the path B while there are beams proceeding on the path A and the path C. The beam on the path A is modulated by the SLM 522 as the holographic signal beam corresponding to the input signals and, then, introduced into the medium 510. The beam on the path C is used as the holographic reference beam whose polarization direction turns by 90 degrees by the λ/2 plate 532 so that two beams on the path A and the path C have a same polarization direction. The interference pattern between the holographic reference beam and the holographic signal beam is recorded on the medium 510. In the holographic reproduction mode, the shutter 518 is controlled to be shut off and the λ/2 plate 503 is controlled so that only the horizontally polarized reference beam may be introduced to the holographic polarized beam splitter 504. The beam on the path C of two horizontally reproduced beams generated by the holographic polarized beam splitter 504 is used as the holographic reference beam whose polarization direction is rotated by the λ/2 plate 532 so that the holographic reference beam may be introduced into the medium 510. Accordingly, the holographic reproduced beam proceeds along the extension direction of the path A to be displayed on the CCD 514.

If necessary, the angular multiplexing technique may be used so that the incident angles in the CD/DVD mode and the holographic mode may be changed to record the beams of specific sizes on the holographic polarized beam splitter 504. In case the holographic polarized beam splitter 504 is rotated to record the interference patterns between the reference beam and the beams of specific sizes, the λ/2 plate 503 may be unnecessary and the shutter 518 may be moved to the path A. It is necessary that the shutter 518 on the path A remains shut off except the holographic recording mode.

Figure 7:
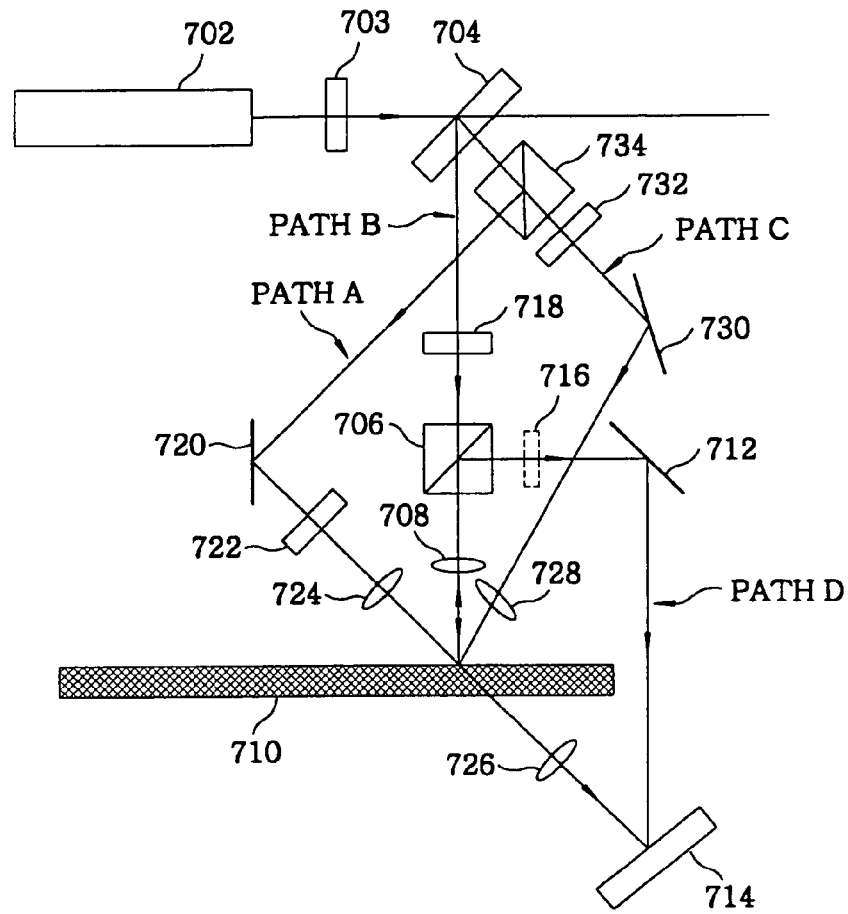
FIG. 7 shows a block diagram of a holographic digital data storage system compatible with a CD/DVD player in accordance with a fourth embodiment of the present invention.

Referring to FIG. 7, there is illustrated a block diagram of a holographic digital data storage system 700 compatible with a CD/DVD player in accordance with a fourth embodiment of the present invention, wherein the holographic storage system 700 comprises a light source 702, two λ/2 plates 703 and 732, a holographic polarized beam splitter 704, two beam splitters 706 and 734, four lenses 708, 724, 726 and 728, a medium 710, three mirrors 712, 720 and 730, a charge coupled device (CCD) 714, a photodiode (PD) 716, a shutter 718 and a spatial light modulator (SLM) 722. In the holographic digital data storage system 700 shown in FIG. 7, the optical path of the CD/DVD mode is separate from that of the holographic mode. In comparison with FIG. 1, two λ/2 plates 703 and 732, the holographic polarized beam splitter 704, the lens 728, the mirror 730 and the polarized beam splitter 734 are added and the shutter 718 is shifted from path A to path B.

The λ/2 plate 703 allows the polarization direction of the linearly polarized beam introduced from the light source 702 to be rotated by a predetermined angle. The beam with the rotated polarization direction is introduced to the holographic polarized beam splitter 704.

Figure 8:
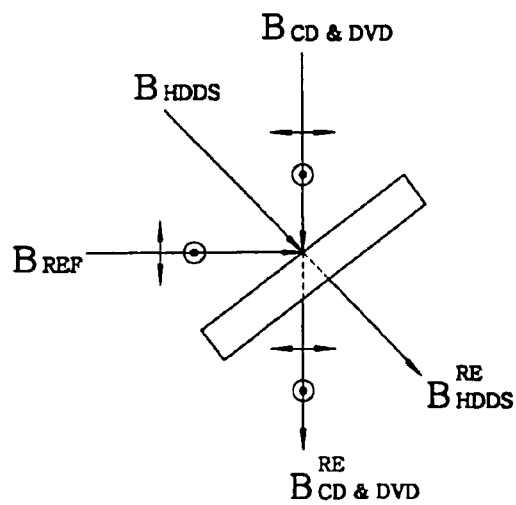
FIG. 8 sets forth an embodiment of the holographic polarized beam splitter shown in FIG. 7.

The holographic polarized beam splitter 704 is made of a higher birefringence material such as $LiNbO_3$ or $BaTiO_3$. Referring to FIG. 8, there is illustrated an embodiment of the holographic polarized beam splitter 704 made by using the birefringence characteristics. It is assumed that CD/DVD horizontal/vertical polarized beams of specific sizes $B_{CD\&DVD}$ are used to reproduce the CD/DVD players, respectively and a holographic beam of specific size $B_{HDDS}$ is used to reproduce the holographic signals. The CD/DVD holographic/vertical polarized beams of specific sizes $B_{CD\&DVD}$ and the holographic beam of specific size $B_{HDDS}$ are introduced with predetermined angles, respectively. The CD/DVD horizontal/vertical polarized beams of specific sizes $B_{CD\&DVD}$ have the beam sizes and the beam shapes required in the CD/DVD players, respectively. It is preferable that the holographic beam of specific size be introduced with a polarization angle of 45 degree. For illustration, it is assumed that the CD/DVD horizontal/vertical polarized beams of specific sizes $B_{CD\&DVD}$ are used to the CD/DVD players, respectively, and the holographic beam of specific size $B_{HDDS}$ with the polarization angle of 45 degree is divided into a horizontal and a vertical polarized beam, wherein the horizontal polarized beam is transmitted and the vertical polarized beam is reflected.

In the CD mode, the λ/2 plate 703 is controlled to make the direction of the beam be horizontally oriented. If only the horizontal polarized beam is introduced into the holographic polarized beam splitter 704, the horizontally polarized CD reproduced beam $B_{CD}^{RE}$ and the horizontal component of the holographic reproduced beam $B_{HDDS}^{RE}$ are provided through the path B and the path C, respectively. The CD reproduced beam $B_{CD\&DVD}^{RE}$ is detected by the PD 716 or the CCD 714 after passing through the path B and the path D as illustrated in FIG. 5. The horizontal component of the holographic reproduced beam $B_{HDDS}^{RE}$ is transmitted by the polarized beam splitter 734 and, then, proceeds through the path C to be reflected by the medium 710 without influencing the reproduction of the CD player. If the intensity of the holographic reproduced beam $B_{HDDS}^{RE}$ is so high that the CD player may be abnormally reproduced, a shutter may be added between the holographic polarized beam splitter 704 and the polarized beam splitter 734.

In the DVD mode, the λ/2 plate 703 is controlled to make the direction of the beam be vertically oriented. The vertically polarized DVD reproduced beam $BDVD^{RE}$ proceeds through the path B and the path D to be detected as the CD mode while the vertical component of the holographic reproduced beam $B_{HDDS}^{RE}$ is reflected by the polarized beam splitter 734 and proceeds through the path A so that the DVD player may be normally reproduced.

In the holographic recording mode, the λ/2 plate 703 is rotated by a predetermined polarization angle so that the reference beam has a horizontal and a vertical component. The beam required in the CD/DVD player is shut off by the shutter 718 on the path B and only the holographic beam is divided into a horizontal and a vertical polarized beam by the polarized beam splitter 734. The horizontal polarized beam is transmitted through the polarized beam splitter 734, modified to be vertically polarized and introduced through the path C into the medium 710 as the holographic reference beam. In the holographic reproduction mode, the λ/2 plate 703 is controlled so that only the horizontally polarized reference beam may be introduced to the holographic polarized beam splitter 704. The shutter 718 turns to be shut off so that no beam proceeds through the path B. The beam transmitted through the polarized beam splitter 734 and the λ/2 plate 732 is introduced through the path C to the medium 710 as the holographic reference beam so that the holographic reproduced beam is displayed through the lens 726 to the CCD 714.

Figure 9:
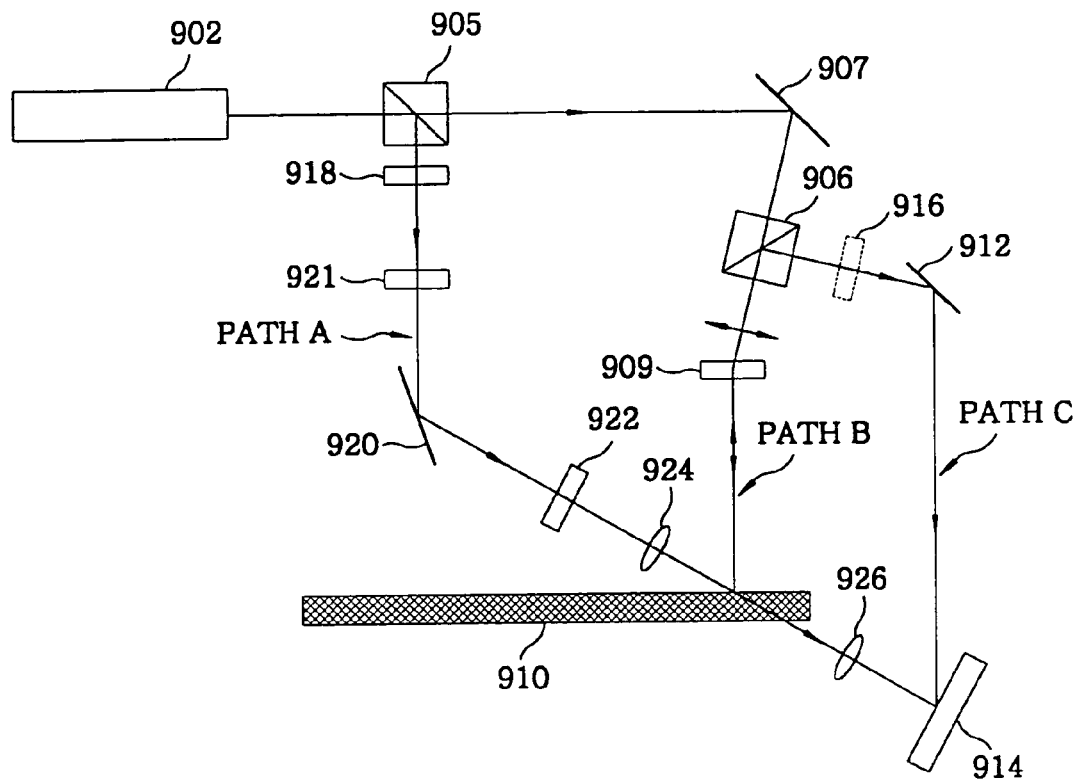
FIG. 9 provides a block diagram of a holographic digital data storage system compatible with the CD/DVD player in accordance with a fifth embodiment of the present invention.

Referring to FIG. 9, there is illustrated a block diagram of a holographic digital data storage system 900 compatible with a CD/DVD player in accordance with a first embodiment of the present invention, wherein the holographic storage system 900 comprises a light source 902, two beam splitters 905 and 906, three mirrors 907, 912 and 920, a holographic optical element (HOE) lens 909, a medium 910, a charge coupled device (CCD) 914, a photodiode (PD) 916, a shutter 918, a beam expander 921, a spatial light modulator (SLM) 922 and two lenses 924 and 926. In the holographic digital data storage system 900 shown in FIG. 9, the HOE lens 909 records two CD/DVD numerical apertures and a holographic numerical aperture by using a spatial multiplexing method or an angular multiplexing method. The HOE lens 909 is made of photopolymer and obtains a diffraction efficiency as much as nearly 100%.

Figure 10:
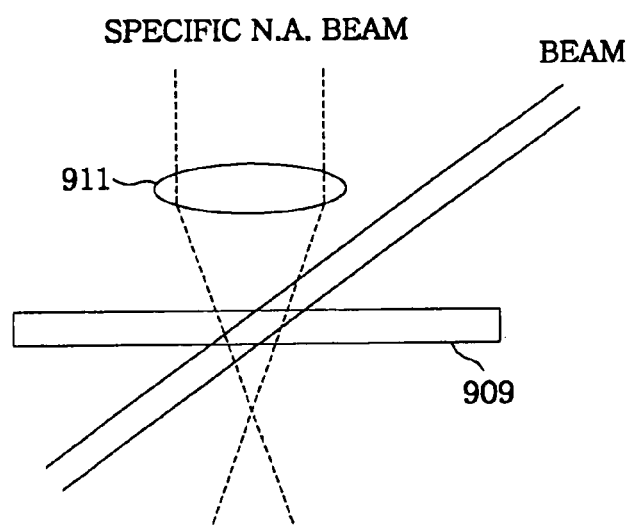
FIG. 10 exhibits an embodiment of the holographic optical element shown in FIG. 9.
Figure 11:
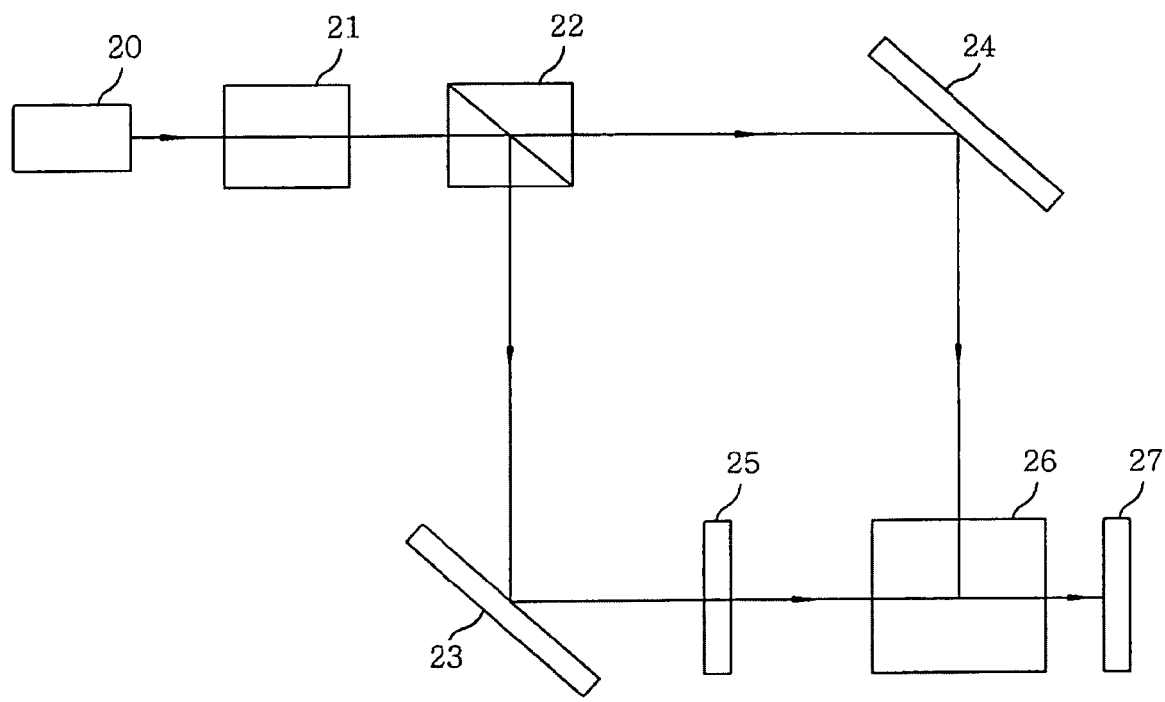
FIG. 11 displays a block diagram of a conventional holographic digital data storage system.
Figure 12:
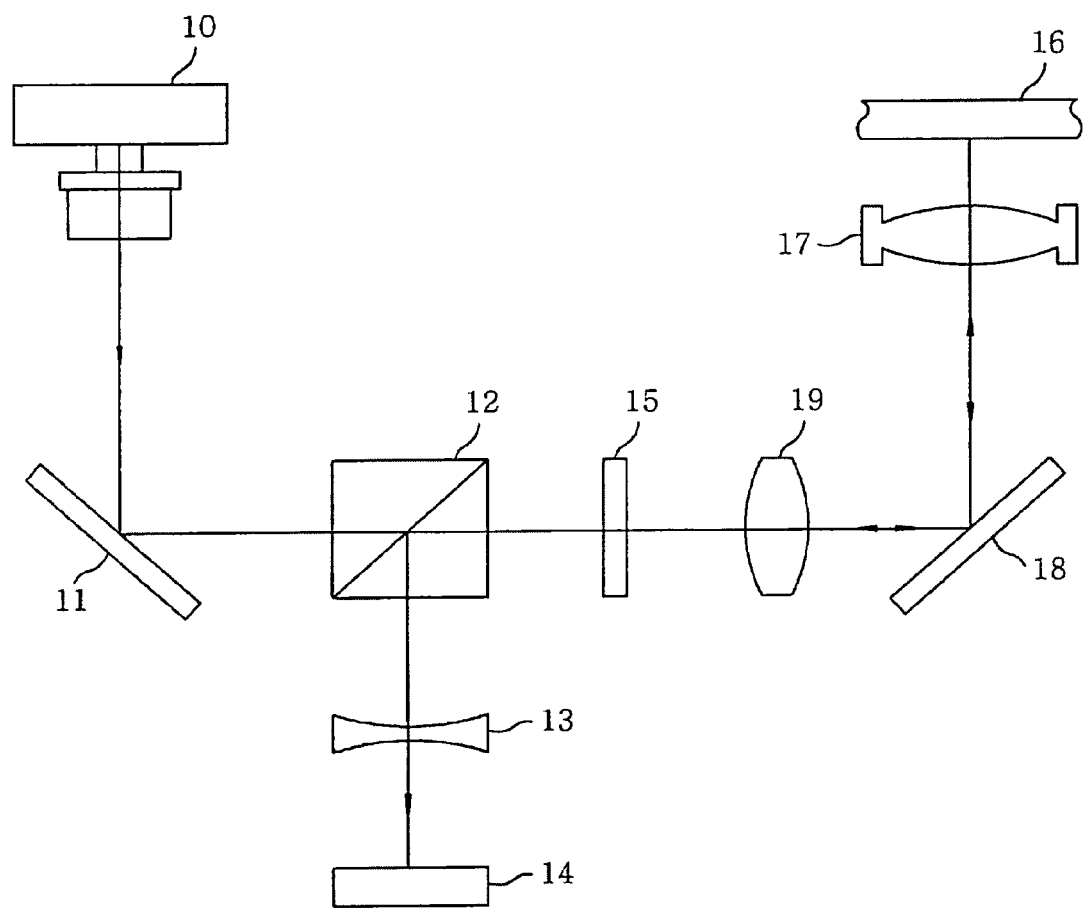
FIG. 12 depicts a block diagram of a conventional CD/DVD player.

Referring to FIG. 10, there is illustrated an embodiment of the HOE lens 909 made by using a spatial multiplexing method. The beams with CD/DVD specific numerical apertures and a holographic specific numerical aperture are introduced sequentially in accordance with the reference beam represented by two solid lines. Three different lenses 911 are preferably used to obtain three different numerical apertures. For illustration, it is supposed that the HOE lens 909 is made in order to have a CD numerical aperture at a first location, a DVD numerical aperture at a second location and a holographic numerical aperture at a third location.

The beam generated in the light source 902 is divided into a transmitted beam and a reflected beam by the beam splitter 905. The transmitted beam is reflected by the mirror 907, transmitted through the beam splitter 906 and, then, illuminated to the HOE lens 909 as the reference beam. As the HOE lens 909 moves to the locations corresponding to the CD/DVD modes or the holographic mode, three beams with their corresponding specific numerical apertures are illuminated through the path B to the medium, respectively. The reflected beam proceeds through the path A. Specifically, the reflected beam is transmitted through the shutter 918 and the beam expander 921 that expands the beam into the holographic beam, reflected by the mirror 920 and modulated by the SLM 922 to be illuminated through the lens 924 into the medium 910 as the holographic signal beam.

In the CD mode, the shutter is controlled to be shut off so that the beam proceeds only through the path B. The HOE lens 909 is shifted to the first location so that the beam with a numerical aperture required to the CD player is introduced to the medium 910. The beam is reflected by the medium 910 and transmitted through the HOE lens 909. The HOE lens 909 generates a reproduced beam corresponding to the reflected beam by the medium 910. The reproduced beam is transmitted to the opposite direction of the original reference beam. The reproduced beam by the HOE lens reflected by the beam splitter 906. The reflected beam is detected by the PD 916 or by the CCD 914. In the DVD mode, it is sufficient that the HOE lens 909 is shifted to the second location.

In the holographic recording mode, the shutter 918 is open and the HOE lens 909 is shifted to the third location. The beam on the path B functions as the holographic reference beam and the other beam on the path A functions as the holographic signal beam. In the holographic reproduction mode, the shutter 918 is shut off and the HOE lens 909 is shifted to the third location so that only the holographic reference beam is introduced to the medium 910. Accordingly, the holographic reproduced beam corresponding to the holographic reference beam is displayed on the CCD 914 located at a position along the extension direction of the holographic signal beam.

If necessary, a polarizer or a wave plate is used to control the holographic signal beam on behalf of the shutter 918 and a wave plate may be located before or after the HOE lens 909 in order to control the intensity of the light.

While the invention has been shown and described with respect to the preferred embodiments, it will be understood by those skilled in the art that various changes and modifications may be made without departing from the spirit and scope of the invention as defined in the following claims.

What is claimed is:

1. An optical device capable of reproducing optical information from a plurality of optical storage mediums, comprising:
    a light source for providing a reference beam; and
    an optical system including a beam generation unit which has a beam pattern storage member storing therein one or more light beam patterns,
    wherein the beam generation unit selectively reproduces at least one of the stored light beam patterns in response to the reference beam to provide one or more reproduced light beams at a time, said one or more reproduced light beams serving to reproduce optical information from one of the optical storage mediums, and
    wherein the one or more reproduced light beams include a holographic beam, a CD beam and a DVD beam, and wherein the beam generation unit provides one of the holographic beam, CD beam and DVD beam according to an incidence angle of the reference beam upon the beam pattern storage member.

2. The optical device of claim 1, wherein the beam pattern storage member is a holographic storage medium storing therein interference beam patterns corresponding to the light beam patterns.

3. The optical device of claim 2, wherein the interference beam patterns are stored by angular multiplexing.

4. The optical device of claim 2, wherein the interference beam patterns are stored according to a polarization angle of the reference beam.

5. The optical device of claim 4, wherein the one or more reproduced light beams include a holographic beam, a CD beam and a DVD beam.

6. The optical device of claim 5, wherein, when the reference beam has a first and a second polarization angle, the CD beam and the DVD beam are provided, respectively, and the holographic beam is obtained by expanding beam size of the CD beam and/or the DVD beam by using a beam expander.

7. The optical device of claim 5, wherein the CD beam and a first component of the holographic beam are generated when the reference beam has a first polarization angle; and the DVD beam and a second component of the holographic beam are generated when the reference beam has a second polarization angle, the first and the second components of the holographic beam corresponding to either of a holographic reference beam and a holographic signal beam, respectively.

8. The optical device of claim 7, wherein the first and the second components of the holographic beam are provided with two different projection angles, respectively, with respect to the beam pattern storage member.

9. The optical device of claim 7, wherein the first and the second components of the holographic beam are provided with an identical projection angle with respect to the beam pattern storage member.

10. The optical device of claim 2, wherein the one or more reproduced light beams have different numerical apertures and are provided according to a location of the beam pattern storage member with respect to the reference beam.

* * * * *